United States Patent
Zhang et al.

(10) Patent No.: US 7,704,535 B2
(45) Date of Patent: Apr. 27, 2010

(54) FREEZER TO RETARDER TO OVEN DOUGH

(75) Inventors: Dave Zhang, Portage, MI (US); Xiaoming You, Clarence Center, NY (US); Robert K. Townsend, Niagara Falls (CA); Terrence R. McGovern, Blasdell, NY (US); Jacqueline K. Brown, Williamsville, NY (US); Paul Wisniewski, Buffalo, NY (US); Rajendra G. Kulkarni, East Amherst, NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 10/994,019

(22) Filed: Nov. 19, 2004

(65) Prior Publication Data

US 2005/0202126 A1    Sep. 15, 2005

Related U.S. Application Data

(60) Provisional application No. 60/552,536, filed on Mar. 12, 2004.

(51) Int. Cl.
*A21D 10/02* (2006.01)

(52) U.S. Cl. ............... 426/19; 426/27; 426/62; 426/549

(58) Field of Classification Search ............ 426/19, 426/27, 62, 653, 656, 549
See application file for complete search history.

(56) References Cited

U.S. PATENT DOCUMENTS

| | | | |
|---|---|---|---|
| 3,620,763 A | 11/1971 | Hans | |
| 4,374,151 A | 2/1983 | Lindstrom et al. | |
| 4,406,911 A | 9/1983 | Larson et al. | |
| 4,450,177 A | 5/1984 | Larson et al. | |
| 4,743,452 A | 5/1988 | Feiske et al. | |
| 4,788,067 A | 11/1988 | Seneau | |
| 4,839,178 A | 6/1989 | Seneau | |
| 4,847,104 A | 7/1989 | Benjamin et al. | |
| 4,946,699 A | 8/1990 | Kageyama et al. | |
| 4,966,778 A | 10/1990 | Benjamin et al. | |
| 5,094,859 A | 3/1992 | Sluimer | |
| 5,171,590 A | 12/1992 | Sluimer | |
| 5,254,351 A | 10/1993 | de Boer et al. | |
| 5,385,742 A | 1/1995 | Van Eijk | |
| 5,447,738 A | 9/1995 | de Bruijne et al. | |
| 5,451,417 A | 9/1995 | Freyn et al. | |
| 5,554,403 A | 9/1996 | Nakamura et al. | |
| 5,560,946 A | 10/1996 | Sanders et al. | |
| 5,589,207 A | 12/1996 | Larsen et al. | |
| 5,672,369 A | 9/1997 | Lonergan et al. | |
| 6,017,574 A | 1/2000 | Clemmings et al. | |
| 6,113,952 A | 9/2000 | Vael | |
| 6,365,204 B1 | 4/2002 | Spendler et al. | |
| 6,383,530 B1 | 5/2002 | Iwashita et al. | |
| 6,419,965 B1 | 7/2002 | Douaire et al. | |
| 6,589,582 B2 | 7/2003 | Saito et al. | |
| 6,589,583 B1 | 7/2003 | Hansen et al. | |
| 2003/0049359 A1 | 3/2003 | Kulkarni et al. | |
| 2003/0104100 A1 | 6/2003 | Goedeken et al. | |
| 2003/0165605 A1 | 9/2003 | Brown et al. | |

FOREIGN PATENT DOCUMENTS

| | | |
|---|---|---|
| WO | WO 98/00029 | 1/1998 |
| WO | WO 01/32023 | 10/2001 |
| WO | WO 02/100176 A2 | 12/2002 |
| WO | WO 02/100177 A1 | 12/2002 |

OTHER PUBLICATIONS

Kennedy, C.J. Managing Frozen Foods, Chapter 8.3.5 "Frozen Dough". Woodhead Publishing, copyright 2000. p. 146-149.*

\* cited by examiner

*Primary Examiner*—Lien Tran
(74) *Attorney, Agent, or Firm*—Hodgson Russ LLP

(57) ABSTRACT

A frozen dough comprising flour, a high yeast level comprising one or more yeast with activity covering temperature range of 33-140° F., emulsifiers, dough conditioners, stabilizers, sugar, lipid source and optionally supplemental gluten such that the frozen dough does not require a conventional proofing (proofer) step prior to freezing or prior to baking. When the frozen dough is thawed in a retarder at 33-42° F. for at least 12 hours, or at an elevated temperature of between 43-85° F. for at least 1 hour, and then baked, the baked products have good appearance, taste and texture, and a specific volume of at least 4 cc/gram.

26 Claims, No Drawings

FREEZER TO RETARDER TO OVEN DOUGH

This application claims priority to U.S. provisional application No. 60/552,536, filed on Mar. 12, 2004, the disclosure of which is incorporated herein by reference.

FIELD OF THE INVENTION

The present invention relates generally to the field of frozen doughs and more particularly to a freezer to retarder to oven dough that does not require a conventional proofing (proofer) step. The present invention also relates to methods of making frozen dough. The present invention further relates to methods of making a baked product from the frozen dough.

BACKGROUND OF THE INVENTION

Freshly-baked products are generally preferred by consumers because of their "fresh" taste and aroma. However, the traditional way of preparing freshly baked products is time-consuming. A step that requires a significant amount of time and human care is proofing—during which yeast produces carbon dioxide that expands the product which leads to further expansion during baking. Proofing requires a proofer with temperature and humidity control, as well as experienced personnel attending to the proofing process over the duration of proofing (usually >1 hr).

Many frozen doughs also require proofing. In some frozen doughs, the dough is proofed prior to freezing. A significant time is required for pre-proofing. Additionally, pre-proofed doughs do not have long storage life. In some other frozen doughs, the dough is not proofed but requires chemical leavening.

Frozen doughs have been described that do not need a proofing step, but such doughs typically have chemical leavening agents which may be either very high in level (U.S. Pat. No. 5,451,417), or require more than one acid (WO 01/32023 A1). The former produces a product having biscuit-like taste and texture, and the latter results in a loss of leavening agent's gassing power during storage of the frozen doughs thereby limiting the storage time.

SUMMARY OF THE INVENTION

The present invention provides a frozen dough that is substantially free of chemical leavening and that does not need conventional proofing prior to freezing or after freezing prior to baking. It comprises a high yeast content comprising one or more yeasts with activity in the temperature range of from 33-140° F., and a high gluten content in the range of from 10 to 20 wt % based on the weight of the flour. In one embodiment, the high gluten content for hard rolls is 12-20 wt %.

The overall yeast is present at a concentration of at least about 8 wt % compressed yeast on flour weight basis. The frozen dough can be thawed in a retarder which is generally at temperatures in the range of from 33-42° F. and a humidity of 60% to 90% (preferably 70% to 80% and more preferably 75% to 78%), or at higher temperatures including ambient temperatures without using conventional proofing (proofer). Following baking, the specific volume reaches about 4.0 cc/g or higher. The baked products have desirable texture, flavor and aroma. The frozen dough of the present invention can be prepared into various types of rolls, sweet rolls and breads.

DETAILED DESCRIPTION

The term "conventional proofing" as used herein means allowing the dough to sit at a temperature of from 90° to 100° F., at a relative humidity of 80% to 90% for a time of from 30 to 80 minutes.

All weight percents given herein are based upon the weight of flour used (taken as 100%). For example, a yeast weight percent of 8 is to be interpreted to mean that in a dough product in which 50 grams of flour are used, the yeast content is 4 grams. The phrases "on flour weight basis" and "based on the weight of flour" are used interchangeably and have the same meaning.

The present invention provides a freezer-to-retarder-to-oven dough products that can be baked without conventional proofing, to provide baked products with a good texture and desirable taste. The present invention is based on the unexpected finding that a combination of a high level of temperature selective yeast and a gluten content sufficient to provide adequate gas holding ability in the dough for the gas generated by the high level of yeast improves the performance of the baked products when the frozen dough is allowed to thaw in a retarder. In one embodiment, the retarder is at temperatures between 33-42° F. In another embodiment, the retarder is at higher temperatures, including ambient temperatures. By "ambient temperatures," is meant a temperature in the range of from about 65° F. to 85° F. The dough exhibits superior performance without the use of a conventional proofing step. It is believed that the special formulation contributes to improved gas holding ability necessary for the high yeast content which in turn results in desirable performance.

Accordingly, the frozen dough of the present invention comprises a high yeast content comprising one or more yeast with activity in the temperature range of from 33-140° F., and sufficient gluten to provide gas holding ability during the thawing process such that upon baking, the specific volume of the baked product is about 4.0 cc/g or higher. Other ingredients, which are normally found in dough, such as water, emulsifiers, stabilizers and salt are present. Optional ingredients, such as sweeteners, flavors and colorants may also be present.

It should be understood that the term gluten generally refers to the group of proteins which give dough adequate gas-holding ability. High levels of these proteins can result in superior specific volume in baked products. Although referred to collectively as "gluten," a number of different proteins are responsible. Examples are glutenin and gliadin. However, "gluten" as used here is meant to encompass all structure-promoting proteins, whether or not normally considered to be part of the gluten group, introduced into the dough in any way (for example as part of the flour ingredient, or added as a supplement). It is thought that high gluten content of doughs contributes to the strength of the dough.

The gluten content of the dough of the present invention may also provide texture to the baked product. Accordingly, the gluten content of the dough can be varied to provide not only the desired gas holding power but also desired texture.

In one embodiment, the flour used in the present invention may be a high gluten flour (HG flour). High gluten flours generally have a gluten content in the range of from 12.5 to 15% by weight of the flour. Alternatively, it may be convenient to use a flour which is not high-gluten. However, if a flour is used that is not high-gluten, it may be necessary to supplement the dough mix with gluten to form a dough which has the ability to hold gas such that when the dough is baked, a product having a specific volume of 4 cc/gm is obtained. For example, the gluten can be added to the dough mix, or, if convenient, one or more of the flours used in preparing the mix can be pre-supplemented with gluten.

The gluten content of the dough should be in the range of from 10 to 20 wt %, with higher gluten levels generally giving a dough with better gas-holding ability. For hard rolls, the gluten content is in the range of from 12-20%.

Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used with other flours.

Flours which can be used in the doughs of the present invention include, but are not limited to, wheat flour, potato flour and bread flour, or combinations and mixtures thereof. The flour of the present invention may be enriched flour, i.e., flour that contains federally mandated amounts of flour, niacin, ferrous sulfate, riboflavin, enzyme, and thiamine mononitrate folate. Other types of flours may be substituted for the enriched flour or used in combination with enriched flour.

The dough of the present invention also preferably comprises additional gluten or gluten hydrolytes. As mentioned above, gluten is known to contain gliadin and glutenin. Accordingly, these individual components or combinations thereof may be used instead of gluten. The gliadin may be alpha, beta, gamma or omega gliadin or combinations thereof.

The dough of the present invention may include flour from one or more grains (such as oats, corn, barley, wheat, rye and the like). The dough may include particulate materials from the grains (such as crushed wheat particles). Further, the dough may also include whole seeds or crushed seeds. Useful seeds are well known in the art and include sunflower seeds, caraway seeds, flax seeds, sesame seeds and the like. Thus, multigrain products can be prepared to improve the taste and/or to add nutritional value.

Sufficient water may be added to the present doughs to achieve the desired consistency. The precise amount of water depends on factors known to those skilled in the art, including the type of yeast used, the desired final product, and the amount and type of other ingredients. Water is typically added in an amount of about 45 wt % to about 70 wt %, on flour weight basis.

The frozen dough the present invention comprises one or more types of yeast. The yeasts may be active within specific temperature ranges. The active temperature ranges of the different yeasts may overlap, or they may be distinct. A type of yeast suitable for this invention is the cold tolerance yeast, which is typically active at temperatures between 33° to 60° F. Another type of suitable yeast is the regular Baker's yeast which is optimally active at between 80°-110° F. If desired, two or more types of yeast which are active at different temperatures between freezing temperature and the temperature of baking can be used to generate gas essentially throughout the process of thawing, i.e., after removal of the dough from the freezer until its transfer to the oven for baking. Accordingly, in one embodiment, a combination of cold tolerance yeast and regular baker's yeast is used such that gas can be generated when the thawing process is carried out over a temperature range of 33° F. to 140° F. Yeast active at temperature ranges which are higher than those for regular baker's yeast may be used if thawing is to be carried out at temperatures higher than 140° F. Other types of yeast such as sugar tolerance yeast, or sweet dough yeast, may also be used.

Yeast can be purchased and used in different forms. The driest commonly used yeast, sometimes referred to as "instant" yeast, contains 3.5-6.0% moisture. Cream yeast contains about 80-85% moisture; compressed yeast contains about 66-73% moisture; and active dry yeast contains about 6-8% moisture. Other examples include baker's yeast, protected active dry yeast, frozen yeast and the like.

In the dough of the present invention, yeast is used in amounts which are greater than 8 wt %, based on the weight of the flour. Preferably, the yeast is present in proportions in the range of from 8 to 15 weight percent. It has been found that yeast proportions lower than about 8 weight percent can result in a baked product with a specific volume which is less than 4 cc/gm. Yeast proportions greater than about 15 weight percent can result in a baked product with a poor appearance. Unless otherwise stated, as used herein, quantities of "yeast" refer to quantities of compressed yeast. However, the invention is in no way limited to compressed yeast. For a given quantity of compressed yeast, one of ordinary skill in the art could easily determine "compressed yeast equivalent," i.e., the quantity of another form of yeast having a different degree of hydration than compressed yeast, but containing the same amount of yeast as the given quantity of compressed yeast. For example, 1 lb compressed yeast is generally equivalent to about 0.3125-4 lbs. instant yeast. Similarly, 1% compressed yeast is equivalent to about 1.5-1.8% cream yeast, which is equivalent to about 0.375-0.5% active dry, which is equivalent to about 0.3125-0.4% instant yeast. The amount of yeast may be chosen to correspond to the desired density of the final baked product and the flavor profile.

The dough of the present invention preferably comprises salt. Salt is generally added to promote better mixing, enhance flavoring, control moisture content within the dough, and/or to control yeast activity. Any commercially available fine-blending salt may be used.

The dough of the present invention also comprises an effective amount of a lipid source. In one embodiment, oil is used. In general, most edible oils are suitable, but vegetable oil is preferred due to its taste and lubrication properties, as well as its lack of trans fat. Examples of vegetable oils that may be used in accordance with the present invention, include, but are not limited to, soybean oil, cottonseed oil, peanut oil, canola oil, corn oil, olive oil and sunflower oil. Soybean and/or cottonseed oils are preferred. Certain oils, including sunflower and corn oils, potentially adversely affect the overall flavor profile of the dough and are therefore, less preferred. Flavored oils may also be used in addition to or in place of the oil of the present invention. Non-limiting examples of flavored oils include olive, sesame, ginger and the like.

Lipid sources may include emulsified oils. Examples of such emulsified oils are shortening, butter or margarine. Glyceride shortenings derived from animal or vegetable fats and oils including synthetically prepared shortenings are suitable for use herein. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Examples of preferred shortenings according to the present invention, include vegetable shortenings, soybean based shortenings or oils, hydrogenated soybean-based shortening or oil, corn oil, palm oil, hydrogenated palm oil, lard and tallow oils.

Hydrogenated shortening is preferably used if a slight crispiness to the outside of the cooked dough is desired. The hydrogenated shortening provides better crust definition, crispiness and better baked volume. Hydrogenated shortening suitable for use with the invention is readily available on the market, as for example the SHO-2 product from Central Soya. Vegetable shortening that may be used in accordance with the present invention is preferably in the form of shortening flakes. Hydrogenated shortening is preferably used at a low concentration to minimize trans fat related issues.

The amount and type of fat source may be selected by those skilled in the art based on various factors including the ingredients of the frozen dough, and based on the desired taste and physical characteristics, such as maintaining a consistent internal structure.

The dough of the present invention comprises emulsifiers between 0.05% to 0.5% or higher as permissible under the FDA guidelines. Suitable emulsifiers include lecithin, hydroxylated lecithin; mono, di, or polyglycerides of fatty acids, such as stearin and palmitin mono and dyglycerides, polyoxyethylene ethers of fatty esters of polyhydric alcohols, such as the polyoxyethylene ethers of sorbitan distearate; fatty esters of polyhydric alcohols such as sorbitan monostearate; polyglycerol esters of mono and dyglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates (SSL) and all members of the sucrose ester family thereof, all varieties of diacetyltartaric esters of fatty acids, diacetyl tartaric acid ester of monoglyceride ("DATEMS"), and the like, and mixtures thereof.

The dough of the present invention includes one or more stabilizers which are typically hydrophilic colloids. These can be natural, i.e. vegetable, or synthetic gums and may be, for example, carrageenan, guar gum, alginate, xanthan gum and the like or semi-synthetic such as methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g. dextrose carrier. The amount of these stabilizers for this product is between 0.2 to 1.6 or higher, as permissible under FDA guidelines.

The dough of the present invention may also include flavoring and/or coloring agents. The dough may optionally contain suitable amounts of, for example 0.01 to 0.5%, flavoring agents and/or coloring agents. When using flavorings, the amount of water and salt used in the dough may have to be adjusted to take into account, for example, the amount of salt and water already contained in the flavoring. It is believed that "fine tuning" of the amount of salt and water in the dough would be within the ability of one of ordinary skill in the art. An example of a suitable flavoring is butter flavor and yeast flavor. It will be appreciated by those skilled in the art that many different individual flavors can be used to achieve the ultimate desired flavor.

Vitamin and minerals may also be added to the dough as desired. Riboflavin is a commonly added vitamin to the dough. Vitamins and minerals may be added as enriched flour or added individually. In addition, calcium in absorbable or elemental form may also be added.

Sweeteners may be added to the present dough to provide for texture and/or flavor. Sweeteners such as sugars may be added for the additional purpose of providing a source of energy for the yeast. In one embodiment, dextrose and/or other sugars such as sucrose, crystalline fructose, high fructose corn syrup (HFCS) or a combination of these sugars may be used. Alternatively or additionally artificial sweeteners such as aspartame, saccharine, sucralose, alitame, cyclamate and the like may also be used.

If desired, the dough of the present invention may contain oxidants such as azodicarbonamide, potassium iodate and the like.

The ingredients of the present invention may be included as a combination. For example, a dough conditioner comprising one or more of the following may be used: oxidants, enzymes, emulsifiers, flour and oil. A non-limiting example of such a conditioner is Tolerance Plus. The dough conditioner may also contain ascorbic acid. Dough conditioners can be used in a wide range of weight percents, as long as their presence and amount does not cause the specific volume of the baked product to be less than 4 cc/gm. An acceptable range for most conditioners is in the range of from 0.3 to 2.1 wt %.

If desired, the dough of the present invention may also comprise enzymes. The enzymes may be selected from a group including, but not limited to, amylase, hemicellulase, glucose oxidase, xylanase and the like. Determination of the amount and type of enzyme is well within the purview of those skilled in the art. Use of enzymes, such as amylases may be advantageous in that they may retard staling of the frozen dough or the resulting rolls, breads and the like. Enzymes may also result in an increased strength, improved extensiblity or elasticity, stability and reduced stickiness of the dough, thus resulting in improved machinability during manufacture. The effect on the dough may be particularly advantageous when a lower content gluten flour is used. The improved machinability is of particular importance in connection with dough which is to be processed industrially. The amount and type of enzyme of the present invention may be determined by those skilled in the art depending on the specific desired resulting properties.

The dough of the present invention may include reducing agents, particularly for more flow in retarder resulting in a better baked shape. Suitable reducing agents include, but are not limited to, L-cysteine and glutathione. It is believed that the reducing agents contribute to the high gluten dough becoming more malleable.

Preferably, the dough is shaped into a desired shape prior to being frozen, such as, into the desired forms such as a square, other polygons, or round, or rolled into rolls. If desired, the dough may cut after freezing and before thawing.

The dough rheology can be modified to suit different categories of baked products. In contrast to relatively dense products like sheeted pizza dough and bread sticks (2-3 cc/g), the present dough can expand such that it has a specific volume of 4.0 cc/gm or greater.

The frozen dough does not require conventional proofing. The dough can be prepared and frozen without proofing and after removal from the freezer, can be thawed in a retarder or at ambient temperatures as described herein and then transferred to an oven again without proofing.

The dough of the present invention is a high-gluten, high-yeast dough, wherein leavening by yeast alone will result in a specific volume of the baked product being at least 4 cc/gram. The dough of the present invention does not need chemical leavening. Accordingly, the dough of this invention is substantially free of chemical leavening. As used herein, the term "substantially free" of chemical leavening indicates that it does not have both the acid and the base in amounts that will cause significant leavening. Generally, it is considered that no significant leavening will be achieved if the chemical leavening components are present in amounts less than 0.2% each on flour basis. In one embodiment, the chemical leavening components are present in amounts less than 0.1% each on flour basis and in another embodiment, the dough is free of chemical leavening system components. Since the acid or the base alone is not expected to cause any leavening, the dough may contain either the base or the acid alone in amounts higher than 0.2% as long as it does not produce an undesirable taste.

Method of Preparing Frozen Dough

The present invention also relates to a method of making frozen dough that comprises combining the dough ingredients set forth herein, shaping and freezing the dough. The dough formed from these methods does not require conventional proofing.

The type and relative amount of ingredients (including the required, preferred and optional ingredients) according to these methods are as set forth above with respect to the frozen dough of the present invention. In particular, according to the present invention, the ingredients include a high level of yeast and gluten. Other ingredients such as water and flour, as well as optional ingredients such as, for example, sugar and lipid source should be used in amounts such that the baked product has a specific volume which is greater than 4 cc/gm. Exemplary and recommended amounts are as set forth above with respect to the frozen dough.

The combining step may include either combining all of the ingredients at once or combining different combinations of ingredients first and then combining all of the ingredients together. For example, according to one embodiment, certain of the ingredients are combined to form a pre-mix, including for example, the salt, stabilizers and sugar. Then, the pre-mix is combined with the remaining ingredients including the flour, yeast, water and lipid source. The pre-mix and/or the final mixture may include one or more additional ingredients as set forth herein.

According to a preferred embodiment of the present invention, the combining step includes mixing all the ingredients. The ingredients may be mixed with one another by mixing methods generally known in the art.

After combining the ingredients, they are then mixed (or further mixed if mixing steps have already taken place) by any suitable mixing apparatus, such as a Hobart mixer. By way of example only, the ingredients are mixed for about 2 to about 4 minutes on a first speed (low) and then for about 7 to about 19 minutes on a second speed (high), which is faster than the first speed. Preferably, the ingredients are mixed for about 2 minutes on low speed and for about 10-12 minutes on high speed. Mixing preferably takes place so that the dough temperature after mixing is preferably between 65° F.-72° F.

It is preferable to perform desired shaping of the dough prior to freezing of the dough. The dough can be formed into desired shapes by means such as rounding, sheeting, cutting, or rolling the dough into the form of square, other polygons, sphere, cylinder etc. Typically for crusty (Italian) breads, the dough is rounded and rolled into a cylinder shape by using a molder. The dough may also be sheeted.

The shaped dough is then frozen by methods known in the art. If the dough is going to be frozen for a short period of time, the mode of freezing is not critical. However, for prolonged stability, the dough should be frozen such that core temperatures of less than 30° F. and preferably between about 30° F. and about −13° F. are obtained within 1 to 6 hours and more preferably within about 1½ to about 4 hours of the time that the dough is placed in the freezing apparatus. When freezing the dough, a uniform cooling rate throughout the dough is desirable. A convenient method for freezing the shaped dough is by using spiral freezer (−30° F. to −62° F.). Carbon dioxide optionally may be used for gradual freezing (0° F. to −10° F.).

For prolonged stability, the frozen dough is preferably stored at a temperature in a range of from about −42° F. to about −10° F., more preferably at a temperature in the range of from about −20° F. to about −12° F. Frozen dough according to the present invention may be stored for extended periods of time, i.e., at least about 12 weeks.

Optionally, the shaped dough is topped with at least one topping and/or flavoring prior to freezing the dough. Non-limiting examples of suitable toppings and flavorings that may be used in accordance with these methods, are as set forth above.

According to a preferred method herein, the process for preparing the dough of the present invention is as follows:

1) combining all dry ingredients, mix for 2 min on low;
2) mixing on high for about 10-12 minutes so that the final dough temperature is a temperature of 62° F.-72° F., preferably about 65° F.-69° F.
3) forming the dough and cut into desired shapes;
4) freezing.

The frozen dough made according to the present methods does not need to be proofed prior to baking. Further, for using the frozen dough, the dough may be taken directly from the freezer and subjected to thawing in a retarder or at ambient temperatures. The retarder is generally at a temperature of between about 33° F.-42° F. The thawing time will depend upon the size and shape of the dough and the temperature of thawing. In general, dough forms having greater surface-area-to-volume ratios will thaw faster than dough forms of similar volume having lesser surface-area-to-volume ratios. For example, the dough can be thawed in the retarder for at least 8 hours, preferably between 8-48 hrs, more preferably between 12-36 hrs.

In one embodiment, the frozen dough can be thawed at ambient temperatures, such as temperatures between 65° F. and 85° F.

Those skilled in the art will recognize that the time required for optimal thawing at ambient temperatures is generally less than that required in the retarder. The time required can be adjusted to provide for a baked product which has a specific volume of about 4.0 cc/g or higher.

The specific volume of the dough after freezing is typically about 1.2 to 1.3 cc/g. The specific volume following the thawing step depends upon the temperature and time of thawing. For example, if the frozen dough is transferred to a retarder at a temperature of about 33° F.-36° F., for 12 hours or longer, the specific volume is about 1.4-1.6 cc/g, and if thawed at a higher retarder temperature or at ambient temperatures for several hours, the specific volume can be about 2.5 cc/g or higher.

Methods of Preparing Frozen Dough Products

Further provided are methods of making dough products that include removing frozen dough (made by the above-described methods), from a freezer and without proofing the dough, transferring the dough to a retarder or incubating at ambient temperature and then transferring to an oven that is heated to a temperature sufficient to bake the products. In one embodiment, following removal from the retarder, the dough may be allowed to sit at ambient temperature for a period of time up to 2 hours-referred to herein as the "floor time." In another embodiment, the floor time is up to thirty minutes.

The oven preferably is a thermostatically controlled oven. However, any oven known in the art that is suitable for baking may be used. A rack oven with steam application is preferred.

If a convection oven is used, dough products may need to be placed into a cluster in a baking pan.

The dough of the present invention can be fully baked when its interior reaches a temperature of at least about 176° F. (80° C.). These interior temperatures are typically achieved by heating the product at a temperature in the range of from about 250° F. to about 500° F., more preferably from about 325° F. to about 450° F., for a corresponding period of time in the range of from about 10 to about 40 minutes, depending on the weight and shape of the baked product, as well as the type of oven used to bake the product.

In the methods of the present invention frozen dough is thawed and then transferred to an oven without a proofing step. The oven is preferably pre-heated to a temperature sufficient to bake the dough prior to transferring the dough to the oven. For example, the oven may be pre-heated to a temperature in the range of from about 350° F. to about 425° F., preferably about 375° F., which cooks the dough in about 11 to 25 minutes depending on dough size. Alternatively, the dough may be transferred to an oven that has not been pre-heated, or has only been partially pre-heated.

The exact conditions under which the dough is baked will depend upon the type of product, and will be apparent to one skilled in the art. For example, shapes having greater surface-area-to-volume ratios will cook faster than shapes having lesser surface-area-to-volume ratios.

In one embodiment, the dough pieces are removed from the freezer and set out in a baking tray or dish. The tray or dish (or other similar container) is set in a retarder at 33° F.-42° F. After about 12-48 hours, the product may be optionally rested at ambient temperature for a brief period (such as up to 2 hours, preferably up to 30 minutes) and then baked in an oven at 350° F.-400° F. for 9-14 minutes for obtaining soft home-style rolls and 22-30 minutes following steaming for about 15-20 seconds, for crusty surface bread.

Instead of baking, the dough of the present invention can be cooked with steam resulting in a freezer to steamer product. Additionally, it can also be fried into different products such as breakfast items, snack items, etc.

The dough of the present invention can be formed in the shape of a swirl. In swirl product application, use of oil-based paste gives products a pleasant, golden brown, baked color due to oil-frying effect during baking. For water-based paste, water activity (Aw) matching between dough and paste is needed to minimize migration of ingredients between two components (dough and paste).

The present invention will now be described in detail with respect to specific representative embodiments. The examples are intended to be illustrative only. In particular, the invention is not intended to be limited to the methods, ingredients, conditions, process parameters, apparatus and the like specifically recited herein.

The present invention provides compositions which are suitable for preparing baked products which have a crusty Italian bread type surface. The dough has a high yeast content, high gluten flour, low sugar and low fat content. Preferably, substantially all of the flour used to prepare the dough is high gluten flour. If desired, additional sources of gluten may be used. The dough is formed from ingredients in the proportions given in the following table.

TABLE 1

| Ingredient | Range (% of flour) | Preferred Range (% of flour) |
|---|---|---|
| High Gluten Flour | 100 | 100 |
| Gluten | 0-7.0 | 1.5-2.5 |
| Compressed Yeast | 6-16 | 10-12 |
| High fructose corn syrup | 0.5-2.5 | 1.0-2.0 |
| Dextrose | 0.2-2.0 | 0.8-1.2 |
| Emulsifiers | 0.2-1.4 | 0.5-1.1 |
| Dough Conditioner | 0.4-0.9 | 0.6-0.9 |
| Stabilizers | 0.2-0.8 | 0.4-0.6 |
| Lipid Source | 0.5-2.5 | 1.0-2.0 |
| Salt | 1.0-3.0 | 1.5-2.5 |
| Water | 54-66 | 58-62 |

In another embodiment where a softer texture is desired, a combination of bread flour, high yeast content, high gluten, high sugar and high fat is used. With this combination, the baked product has a soft surface and crumb and is similar in appearance and texture to soft home-style rolls. Accordingly, in this embodiment, the dough has the following composition.

TABLE 2

| Ingredient | Range (% of flour) | Preferred Range (% of flour) |
|---|---|---|
| Bread flour | 100 | 100 |
| Gluten | 0-5 | 1.5-2.5 |
| Potato flour | 2.0-6.0 | 3.0-5.0 |
| Compressed yeast | 10-14 | 11-13 |
| High fructose corn syrup | 8.0-27.0 | 13.0-22.0 |
| Emulsifiers | 0.2-1.6 | 0.5-1.2 |
| Dough conditioner | 0.4-0.9 | 0.6-0.9 |
| Lipid source | 4.0-16.0 | 8.0-12.0 |
| Salt | 1.0-3.0 | 1.5-2.5 |
| Water | 45-59 | 47-55 |

Example 1

This example provides a specific formulation for a crusty Italian bread.

TABLE 3

| Ingredient | Amount (% of flour) |
|---|---|
| High gluten flour | 100.0 |
| Gluten | 1.0 |
| Compressed Yeast | 10.0 |
| High fructose corn syrup | 1.5 |
| Dextrose | 1.0 |
| SSL | 0.3 |
| DATEM | 0.5 |
| Dough conditioner | 0.8 |
| Guar gum | 1.0 |
| Soybean oil | 1.5 |
| Salt | 1.5 |
| Water | 60.0 |

All ingredients were mixed together using a Hobart mixer, with a paddle on low speed for about 2 minutes; then on high speed for about 11 minutes. The final dough temperature was between about 65° F.-69° F. The dough was divided, rounded, rested and rolled into a cylinder shape with a molder. Individual loaves were frozen in a blast freezer. After freezing (30 min), the dough pieces were transferred to a regular freezer and stored for at least 24 hrs. For using the products, doughs were set out in a baking tray and put in a retarder at 33° F.-42 F for 12-36 hrs. The thawed product was then baked in an oven at 375° F. for 25 min with 15-20 second steam. This resulted in a desirable baked product with golden brown color, good appearance, and good tasting attributes. A specific volume of about 4.9 cc/g was obtained.

Example 2

This example provides a specific formulation and method for preparing a soft home-style roll.

TABLE 4

| Ingredient | Amount (% of flour) |
|---|---|
| Bread flour | 100.0 |
| Wheat gluten | 2.0 |
| Potato flour | 4.0 |
| Compressed yeast | 11.0 |
| High fructose corn syrup | 17.5 |
| SSL | 0.5 |
| DATEM | 0.4 |
| Dough conditioner | 0.8 |
| Soybean oil | 10.0 |
| Salt | 1.9 |
| Water | 52.0 |
| Methocel | 1.0 |

All ingredients were mixed together using a Hobart mixer, with a paddle on low speed for about 2 minutes; then on high speed for about 10 minutes. The final dough temperature was between about 65° F.-69° F. The dough was shaped and frozen in a blast freezer. After freezing (30 min), the dough pieces were transferred to a regular freezer and stored for at least 24 hrs. The doughs were then set out in a baking tray and put in a retarder at 33° F.-42° F. for 12-36 hrs. The thawed product was then baked in an oven at 375° F. for 11 min with 15-20 second steam. This resulted in a desirable baked product with golden brown color, good appearance, and good tasting attributes. A specific volume of about 6 cc/g was obtained.

Example 3

This embodiment provides three additional examples, one for a hard roll and two for a soft roll formulation. The emulsifier used was SSL. The dough conditioners were Tolerance Plus w/AA, Panodan 205, PBRI and ADA, and the stabilizers were guar gum, coyote gum, and Methocel K4M. Non-fat dry milk (NFDM) and Vital wheat gluten (VWG) were present in the composition. A specific volume of about 6.9 cc/g was obtained

TABLE 5

| Ingredient | Hard Roll | Soft Roll 1 | Soft Roll 2 |
|---|---|---|---|
| Salt | 2.00 | 1.90 | 2.00 |
| Dough Conditioner | 1.47 | 1.20 | 1.21 |
| Emulsifier | 0.40 | 0.40 | 0.38 |
| Stabilizer | 2.00 | 1.00 | 1.00 |
| VWG | 2.00 | 0.00 | 1.00 |
| Dextrose | 1.00 | 0.00 | 0.00 |
| Deactivated Yeast | 1.00 | 0.00 | 0.00 |
| Potato Flour | 0.00 | 1.50 | 0.00 |
| Soy oil | 0.00 | 3.50 | 0.00 |
| HG Flour | 100.00 | 100.00 | 100.00 |
| Cream Yeast | 17.50 | 19.10 | 19.08 |
| Shortening | 1.50 | 1.90 | 0.00 |
| HFCS | 1.50 | 15.00 | 13.50 |

TABLE 5-continued

| Ingredient | Hard Roll | Soft Roll 1 | Soft Roll 2 |
|---|---|---|---|
| Water | 53.10 | 0.00 | 48.00 |
| Butter | 0.00 | 0.00 | 5.00 |
| Spice Blend | 0.00 | 0.00 | 0.02 |
| Egg Powder | 0.00 | 0.00 | 4.40 |
| NFDM | 0.00 | 0.00 | 0.50 |

While this invention has been described through specific embodiments, routine modifications will be apparent to those skilled in the art and such modifications are intended to be within the scope of the present invention.

We claim:

1. A frozen dough comprising flour and between 10 to 15 wt % compressed yeast, lipid source in the range of 0.5 to 2.5 wt %, sweeteners in the range of 0.7 to 4.5 wt %, emulsifiers in the range of 0.2-1.4 wt %, dough conditioners in the range of 0.4-0.9 wt % and stabilizers in the range of 0.2-0.8 wt %, wherein the total gluten in the dough is between 14 wt % to 19 wt %, wherein the dough is substantially free of chemical leavening, wherein the dough is not subjected to a conventional proofing step prior to freezing, and wherein, upon baking without a conventional proofing step, a baked product having a specific volume of at least 6.0 cc/gram is formed.

2. The dough of claim 1, wherein said yeast is between 10 to 12 wt %.

3. The dough of claim 1, further comprising supplemental gluten.

4. The dough of claim 1 wherein said dough comprises high-gluten flour.

5. The dough of claim 1, wherein the dough comprises bread flour.

6. The dough of claim 1 wherein the flour comprises high gluten flour, the sweeteners are in the range of 1.8 to 3.2 wt % and the lipid source is in the range of 1 to 2 wt %.

7. The dough of claim 3, further comprising supplemental gluten in the range of 0.1 to 7 wt %.

8. The dough of claim 1, wherein the yeast is selected from the group consisting of baker's yeast, cold tolerance yeast and combinations thereof.

9. The dough of claim 8, wherein the cold tolerance yeast is active at temperatures between 33° F. and 60° F.

10. The dough of claim 1, wherein the flour is made from one or more grains.

11. The dough of claim 10, wherein the one or more grains are selected from the group consisting of corn, oats, wheat, barley and rye.

12. The dough of claim 10, further comprising whole grain particles.

13. The dough of claim 10, further comprising whole or crushed seeds.

14. The dough of claim 13, wherein the seeds are selected from the group consisting of caraway, sunflower, sesame and flax.

15. A frozen dough comprising flour and between 10 to 15 wt % compressed yeast, sweeteners, lipid source in the range of 0.5 to 2.5 wt %, emulsifiers in the range of 0.2 to 1.6, dough conditioner in the range of 0.4 to 0.9 and stabilizers in the range of 0.2 to 0.8, wherein the total gluten in the dough is between 10 wt % to 15 wt %, wherein the dough is free of chemical leavening and wherein, upon baking without a conventional proofing step, a baked product having a specific volume of at least 6.0 cc/gram is formed.

16. The dough of claim 15, wherein said yeast is between 10 to 12 wt %.

17. The dough of claim 15 further comprising supplemental gluten, wherein the sweeteners are between 0.5 to 2.5%.

18. The dough of claim 15, further comprising supplemental gluten, wherein the flour comprises bread flour and potato flour, and sweeteners are between 8 to 27%.

19. The dough of claim 15, wherein the yeast is selected from the group consisting of baker's yeast, cold tolerance yeast and combinations thereof.

20. The dough of claim 19, wherein the cold tolerance yeast is active at temperatures between 33° F. and 60° F.

21. A method of preparing a baked product which has a specific volume of at least 6.0 cc/gram comprising the steps of:
providing a frozen dough comprising flour, between 10 to 15 weight percent compressed yeast, sweeteners in the range of 0.7 to 4.5 wt %, lipid source in the range of 0.5 to 2.5 wt %, wherein the total gluten content in the dough is between 14 to 19%, wherein the dough is substantially free of chemical leavening and wherein the dough is not subjected to a conventional proofing step prior to freezing;
placing the dough, without a conventional proofing step, in a retarder at a temperature of between 33° F. to 42° F. for a period of 12 to 48 hours; and
removing the dough from the retarder and transferring to an oven for baking.

22. The method of claim 21 further comprising the step of placing the dough at ambient temperature for a period of up to 2 hours after removing from the retarder and before transferring to an oven for baking.

23. The method of claim 22, wherein the dough is placed at ambient temperature for about 30 minutes.

24. A baked product which has a specific volume of at least 6.0 cc/gram, which is prepared by the method of claim 21.

25. The baked product of claim 24, wherein the baked product is free of chemical leavening.

26. The frozen dough of claim 1, wherein the dough is not subjected to a conventional proofing step prior to freezing, and wherein, upon baking without a conventional proofing step, a baked product having a specific volume of at least 6.9 cc/gram is formed.

* * * * *